UNITED STATES PATENT OFFICE.

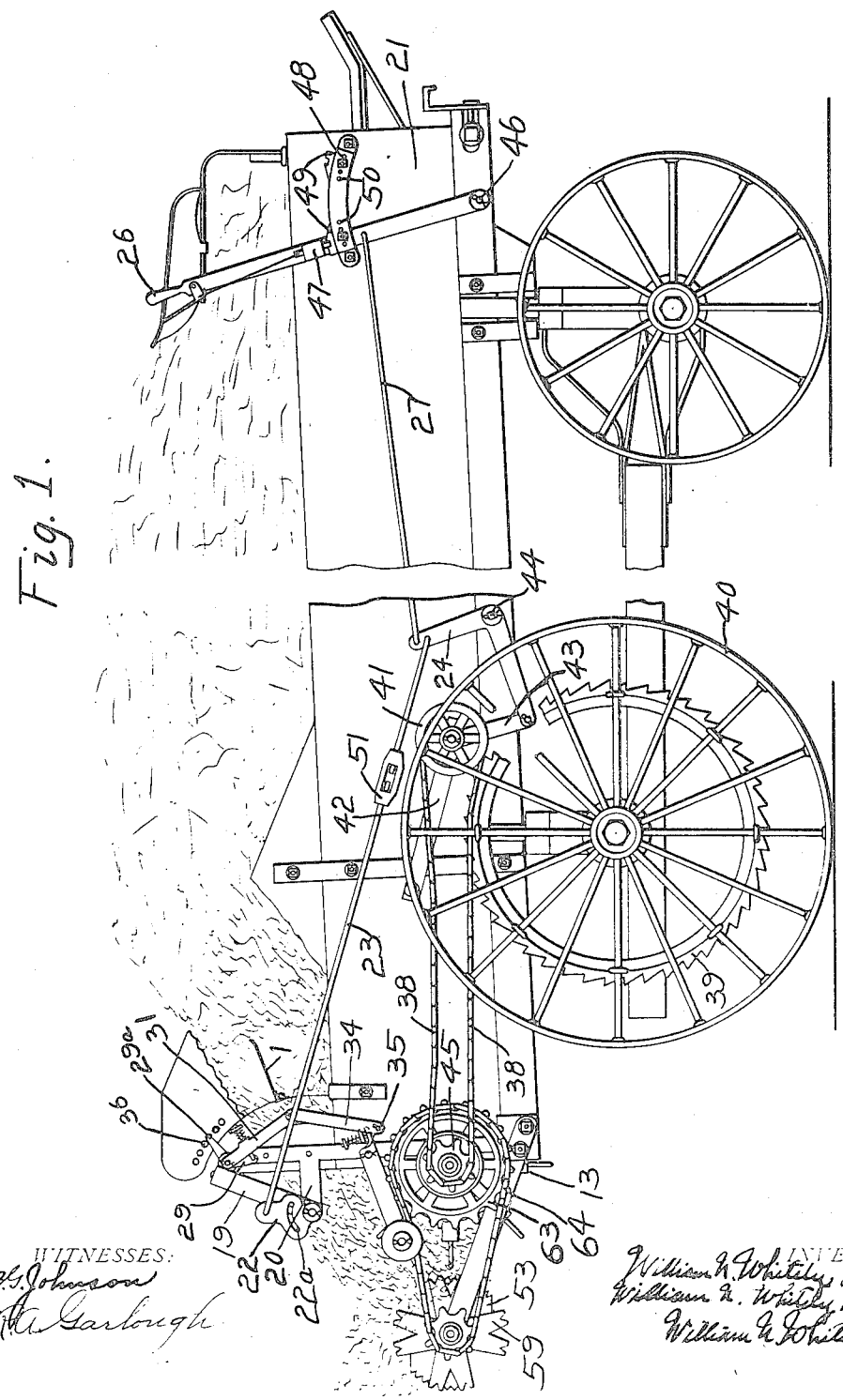

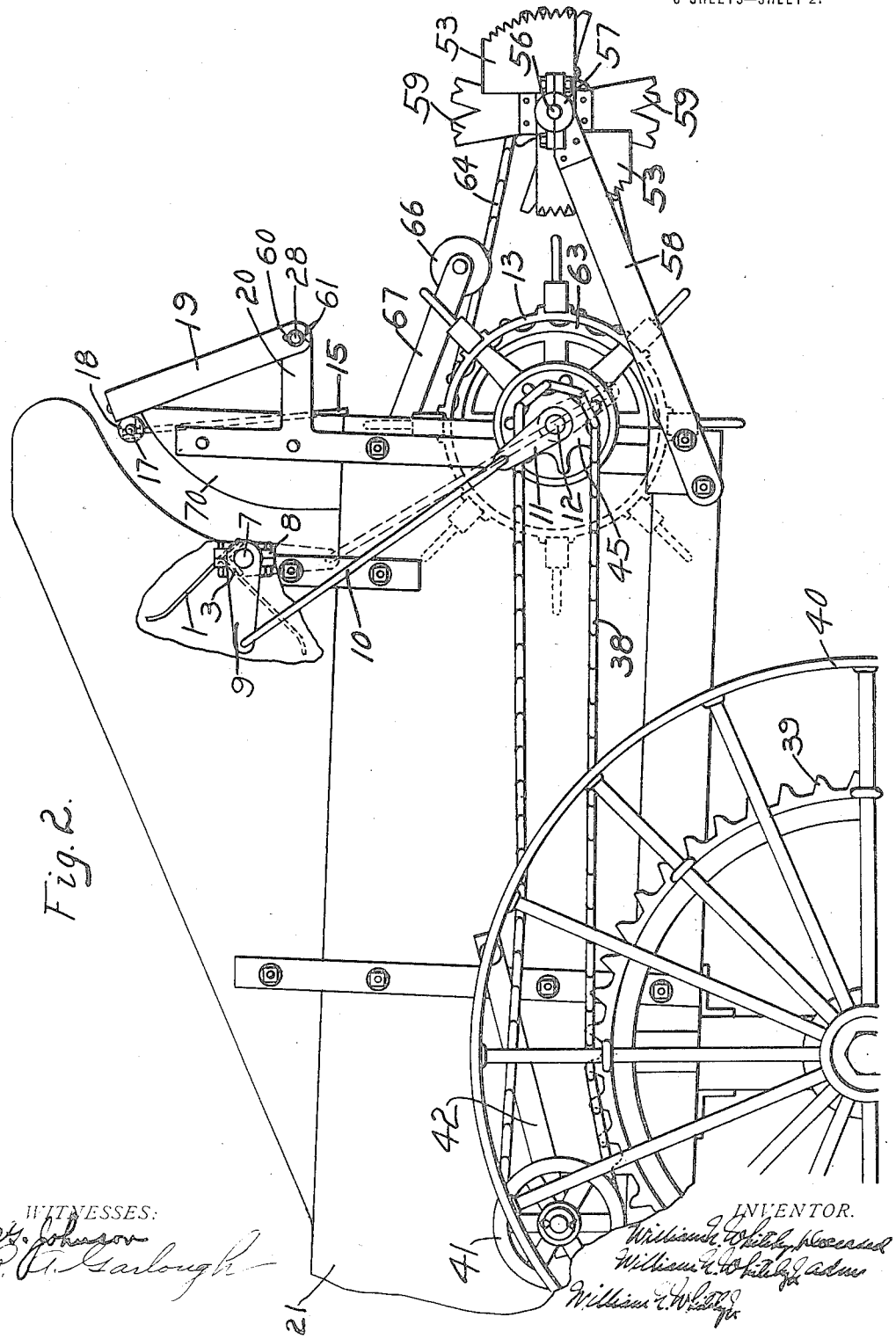

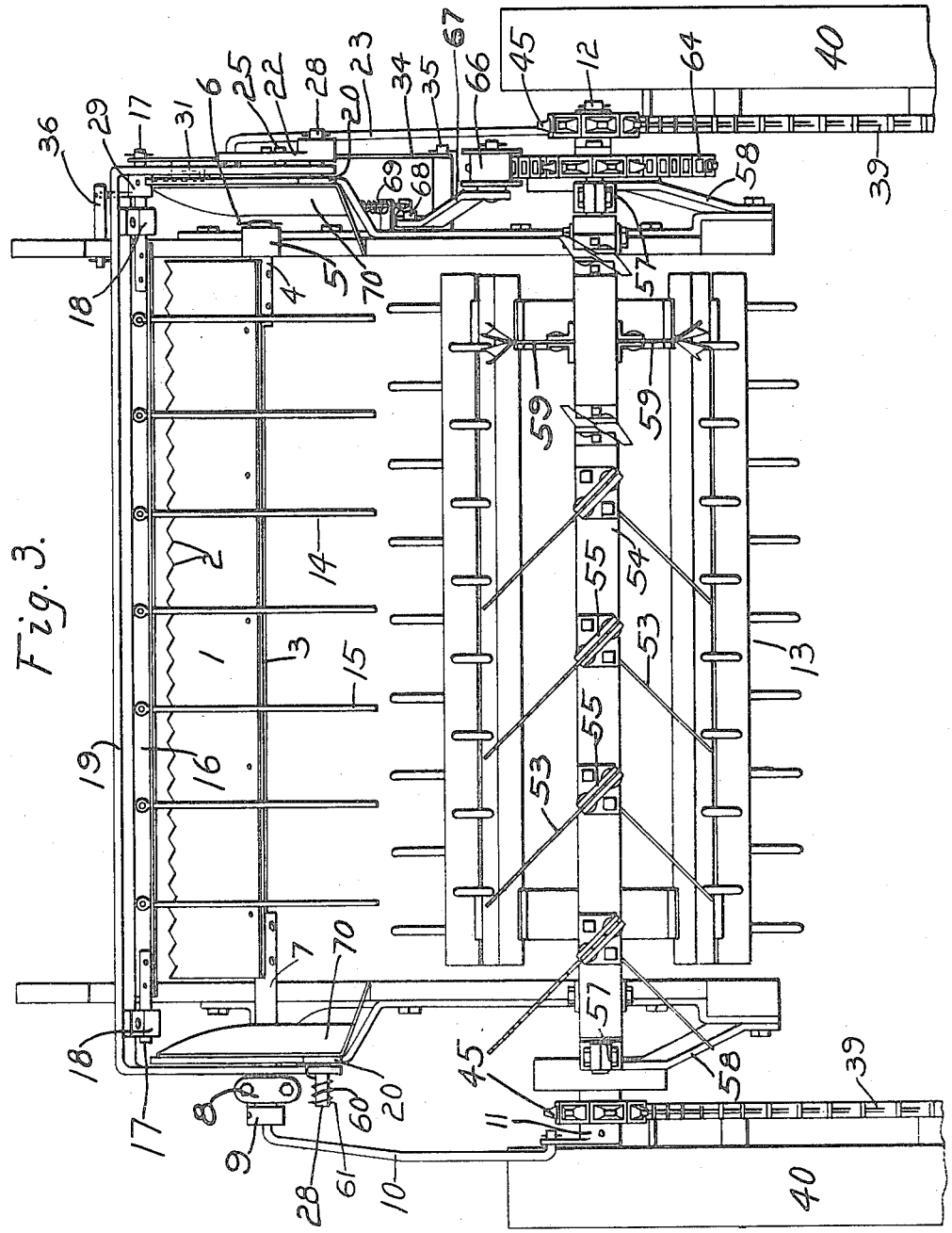

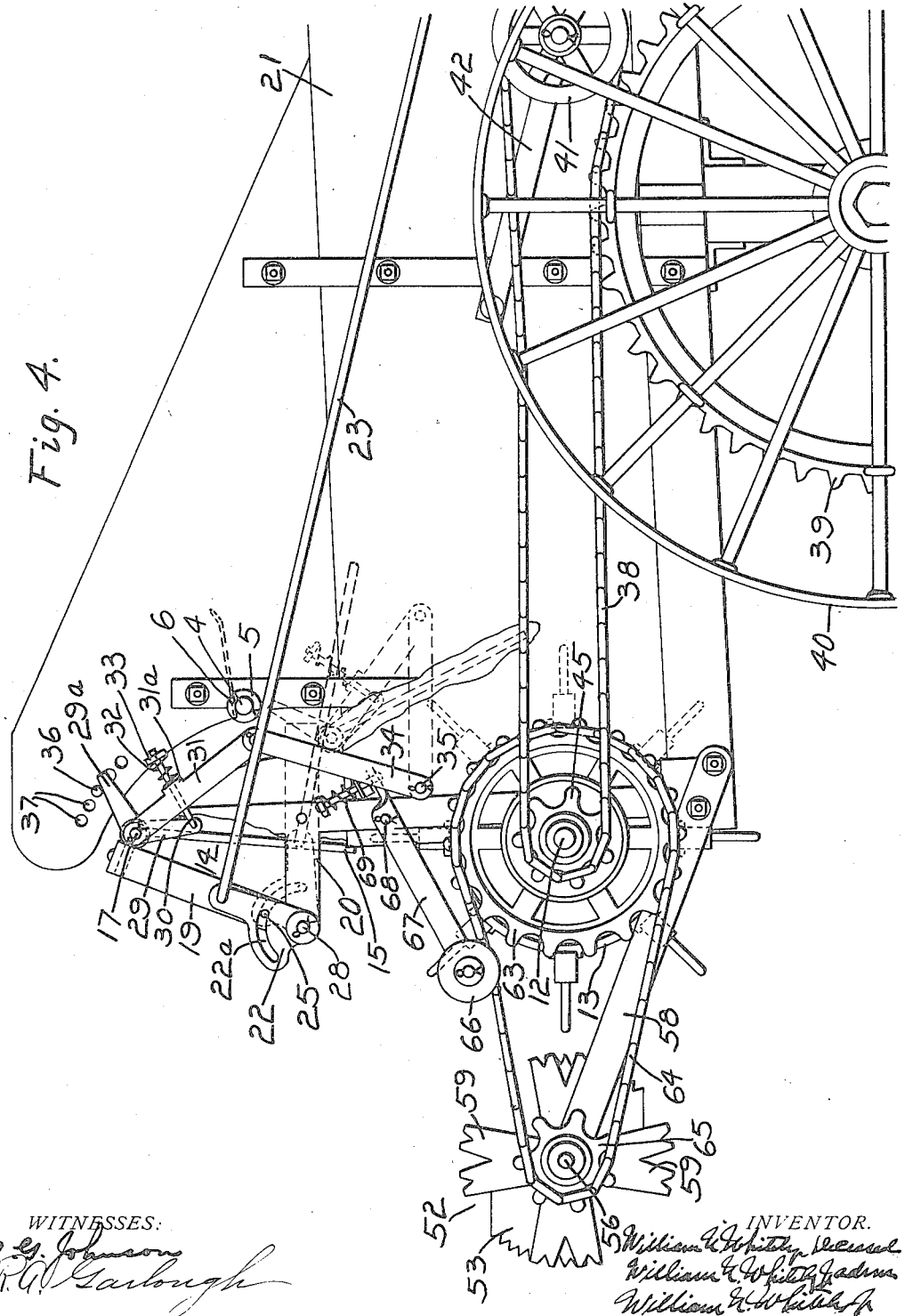

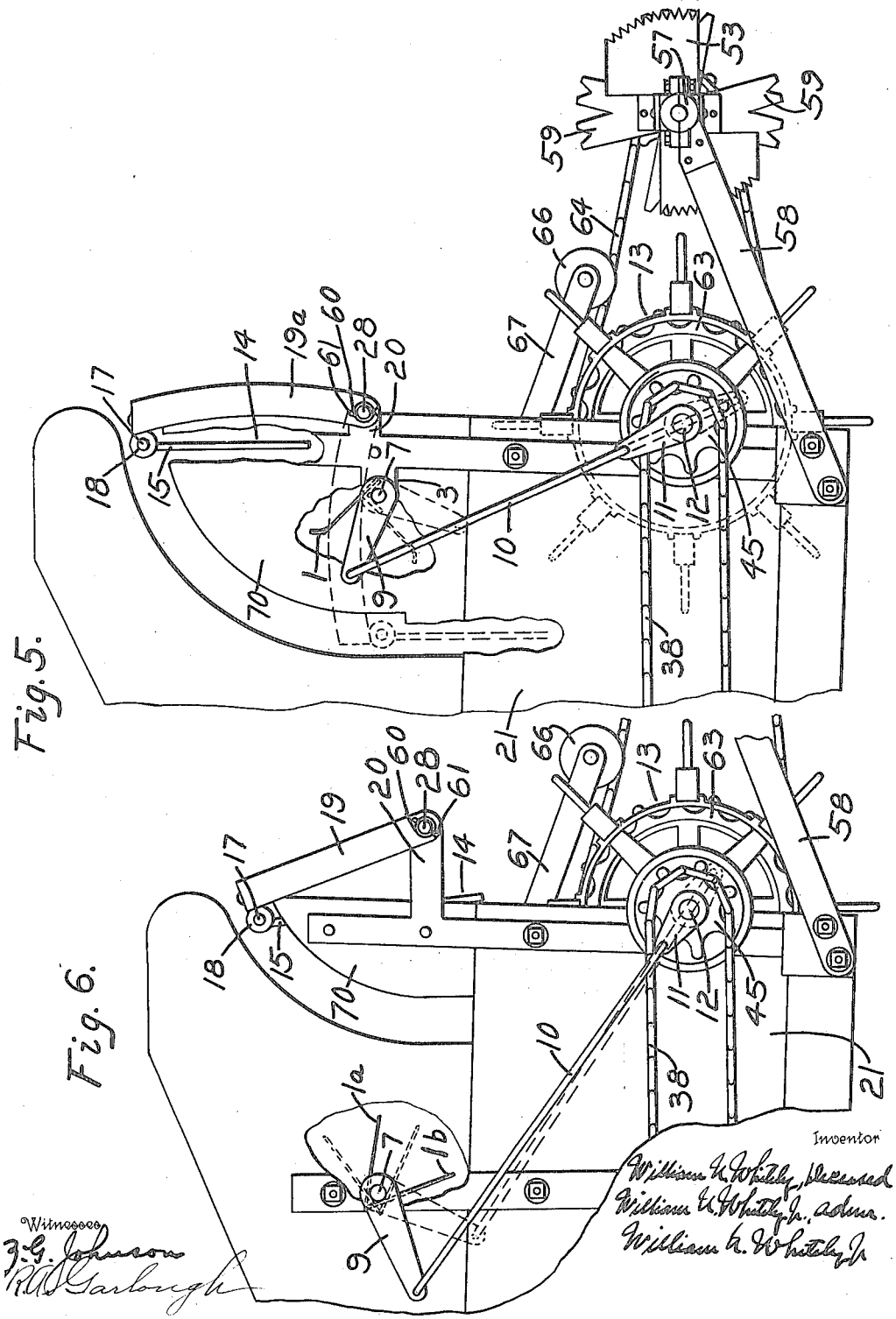

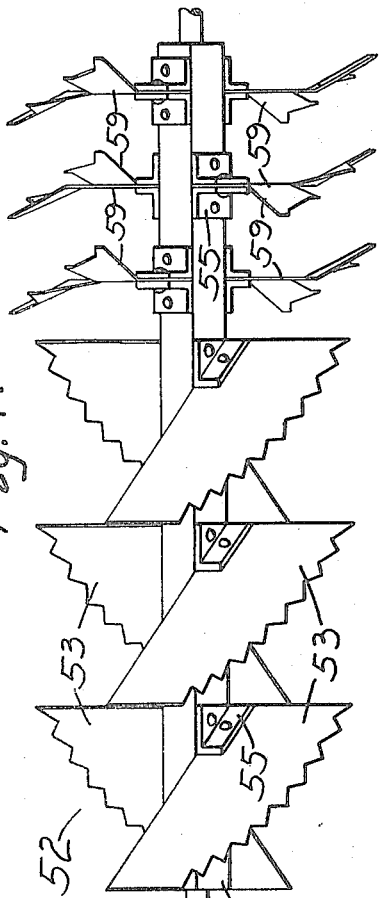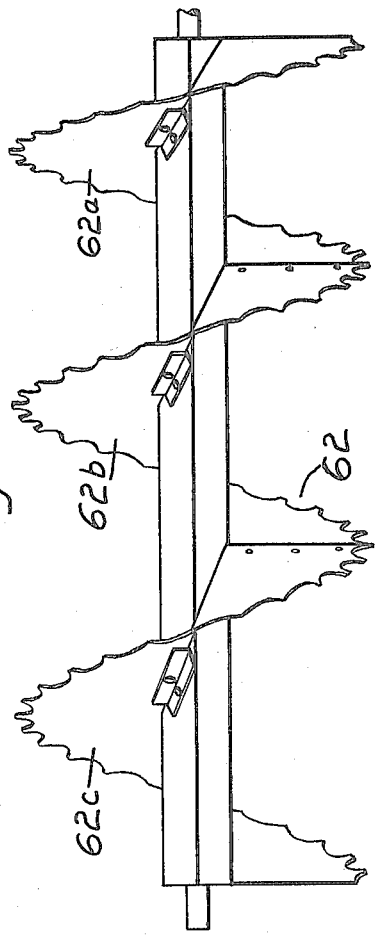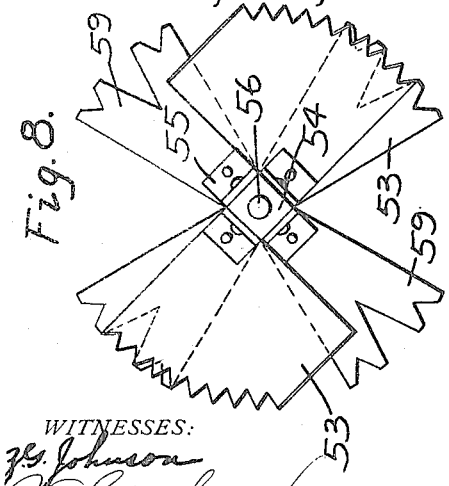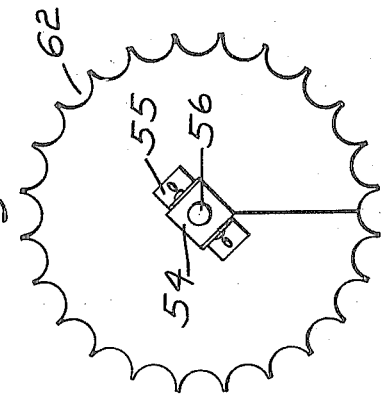

WILLIAM N. WHITELY, DECEASED, LATE OF SPRINGFIELD, OHIO, BY WILLIAM N. WHITELY, JR., ADMINISTRATOR, AND WILLIAM N. WHITELY, JR., OF SPRINGFIELD, OHIO, ASSIGNOR INDIVIDUALLY AND AS ADMINISTRATOR, BY MESNE ASSIGNMENTS, TO INTERNATIONAL HARVESTER COMPANY OF NEW JERSEY, A CORPORATION OF NEW JERSEY.

MANURE-SPREADER.

1,187,953.     Specification of Letters Patent.     Patented June 20, 1916.

Application filed March 18, 1911, Serial No. 615,439. Renewed March 17, 1915. Serial No. 15,041.

*To all whom it may concern:*

Be it known that WILLIAM N. WHITELY, deceased, late a resident of Springfield, county of Clark, and State of Ohio, and WILLIAM N. WHITELY, Jr., of same place, citizens of the United States, did invent certain new and useful Improvements in Manure-Spreaders; and I, WILLIAM N. WHITELY, Jr., administrator of the estate of WILLIAM N. WHITELY, deceased, and for myself do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in manure spreaders.

Our primary object is to provide a manure spreader with means whereby the discharge cylinder and the rake or detainer, which is located over, or in coöperation with, the cylinder while the machine is in operation, are kept from clogging so that at all times they will be free to perform their functions. The device for thus purpose, which may be termed "a manure separator", being particularly adapted to use when a very high load is carried, the object being to utilize a manure bed of the standard farm wagon bed width of 40 or 42 inches so that the running gear will substantially track the same as the ordinary farm wagon, 5 feet or 5 feet 2 inches, for convenience in passing through narrow gates and doorways, also to obtain a lighter weight and draft and less cumbersome and handier type of manure spreader which will, at the same time, have fully as much load capacity as the ordinary wide bed manure spreader which has a bed 54 inches wide and length of rear axle which will average 85 inches as against 76 inches in the type of spreader which we will preferably describe.

Another object is to obtain a positive feed and even flow of the manure to the discharge cylinder by the coöperation of the manure separator with the cylinder and rake in all conditions of use, whether the load be high and piled to a peak along the middle of the bed, or irregularly loaded, so that the load is lumpy and uneven. The manure separator being of a form and arranged and driven so that at the same time it helps to disintegrate the masses of manure, especially long straw or corn stalk manure, in advance and coöperatively with the cylinder. The construction, means of operation, and arrangement, of the manure separator being such that it does not cause the manure to pack in the bed or congest, or accumulate in front of the cylinder or otherwise detract from the free movement of the entire load dischargewardly, on the contrary it being for the purpose of facilitating the loosening, and easy movement, of the mass and to relieve the cylinder and rake or detainer of the weight and solidity of a high load without blocking its passage. The ordinary manure spreader cannot be loaded to a height of more than 20 inches without liability to choke or throw out masses of manure and the load must be carefully put in the bed so that it is evenly distributed over the whole width and length of the body and still the manure will be discharged considerably thicker in the middle of the swath than at the edges. In our construction the manure can be piled 3 feet high and will be easily discharged and much more uniformly distributed across the width of the cylinder in the act of discharge. It will be understood that a comparatively narrow bed, with the manure piled high as described, has fully as much cubic capacity as a wider bed with low load capacity.

Another object is to provide a rake or detainer which will act as an end-gate or means of cutting off the manure from the discharge cylinder prior to the discharge period and which will also act as a rake in coöperating with the manure separator and cylinder while the machine is in operation.

Another object is to provide positive means whereby the machine is thrown in gear simultaneously with the raising of the rake to a position over the cylinder, and by this mechanism the machine may be thrown out of gear without disturbing the rake's position over the cylinder.

Another object is to provide the rake with a contacting device which can be adjusted so that the rake can be thrown to any desired angle over the cylinder, as may be predetermined, when raised over the cylinder by the gear shifting devices.

Another object is to provide adjustable means for regulating the vertical positions of the main drive chains at front so that coincident with the locking of the gear shifting lever in gear the main chains will properly mesh with the driving sprockets and when out of mesh will be coincidentally raised to the proper position free of said sprockets when the lever is locked in out of gear position.

Another object is to provide a secondary cylinder to distribute the manure laterally in a wide swath by means of blades arranged to throw the manure to one side for the purpose of protecting the cylinder driving gear from the manure as well as to make a uniform covering of manure by distributing the swath laterally in one direction whereby the edge of one swath will unite with that of the one just previously spread.

In the drawings:—Figure 1. is a side view of the complete machine showing the side board extensions broken away to exhibit the working of the manure separator. Fig. 2. is a partial side view of the machine on a larger scale showing the driving mechanism for the manure separator, location of the rake over the discharge cylinder and the supporting parts for the secondary distributing cylinder in rear of the discharge cylinder. Fig. 3. is a rear view of the machine as shown in Figs. 1 and 2. Fig. 4. is partial side view of the opposite side of the machine shown in Fig. 2, on the same scale showing the rake in operative position over the discharge cylinder in solid lines and the means by which it may be automatically adjusted to any predetermined angle above the cylinder. Also, in dotted lines, the position it takes in front of the cylinder to keep the manure from clogging the cylinder prior to the distributing or discharge period. Fig. 5. is a partial side view of the machine on the same side as Fig. 2. and on the same scale, showing a different arrangement of the rake and manure separator. Fig. 6. is a partial side view, same as Fig. 5., showing a modified form and different arrangement of the manure separator. Fig. 7. is a plan view of the secondary distributing cylinder showing one form of blades to distribute the manure to the side, laterally in one direction only. Fig. 8 is an end view of Fig. 7. Fig. 9. is a plan view of another form of secondary distributing cylinder. Fig. 10. is an end view of Fig. 9.

The manure separator 1 which may be of any suitable shape, size, or arrangement is preferably made of sheet steel with serrated margins or saw teeth 2. on its front edge as shown in Fig. 3, and is riveted or otherwise attached to a core or shaft 3., which, as shown, may be of the form of an angle bar having at one end a stud —4— riveted to it which forms the bearing at one end, see Fig. 3, and this stud bears in a bracket —5— attached to the side of the bed, Fig. 4., and may be secured by a pin or cotter 6.

At the opposite end of the separator is a stud —7— riveted to the angle bar or core 3 and which extends beyond the side of the bed and is supported or journaled in a bracket 8. There is a crank 9 fastened to the stud 7 in any well known way and a pitman 10 is pivotally connected to the crank 9 at one end, and at its other end to the drive arm 11 which is fastened to the shaft 12 in any suitable way.

The manure separator 1 is preferably located above the cylinder and in front of the rake as shown in Fig. 2 so that it works directly in coöperation with the cylinder 13 and rake 14 and will separate the manure by means of its edge and feed it by means of its upper and lower sides in a loose mass to the rake 14 and cylinder 13 because of the rapid vibrating motion given it by the pitman 10. This prevents the solid mass of a high load from packing back against the rake and cylinder and choking the machine down and at the same time it will feed the manure to the discharge opening because it is vibrated in the line of discharge.

The separator 1 may be of various forms and located otherwise than shown in Fig. 2. In Fig. 5 it is shown closer to the discharge opening of the bed and stands in a plane between the ends of the rake teeth and upper periphery of cylinder 13 and the rake is arranged to pass over in front of it when being lowered instead of passing down in rear of it as in the other views. In Fig. 6. is another form and arrangement of the separator, here it has two divisions, 1ª and 1ᵇ forming a wedge shape, the apex of the wedge forming an edge to separate and the upper and lower divisions to feed the manure. In this form it is arranged slightly farther forward to provide clearance for the rake 14 when being raised and lowered. The rake 14 has teeth 15 depending from a head 16, Fig. 3, which has studs 17 fastened to the ends of head 16 and pivoted in bearings 18 attached to the bail 19, of which 19ª in Fig. 5. is a modification. The bail 19 is pivoted at 28 to brackets 20 at each side of the bed 21 over the cylinder 13 and is arranged to lower downward and forward in front of the cylinder independently of the gear shifting mechanism's movement and to be raised over the cylinder out of the way of the load at the same time the gearing is engaged. In order to accomplish this we provide a loose crank 22 pivoted at 28 on the bracket 20 and to it is pivoted a rod 23 which extends forward and has its forward end pivoted to a rock arm 24 which forms a portion of the gear shifting mechanism. The crank 22 has a slot 22ª in which the pin 25, which is secured to the bail 19, travels when the rake lowers automatically by gravity when the load is out of the bed 21. When the rake is down, as shown in dotted lines in Fig. 4, the pin 25 will be in the bottom of the slot 22ª and as the gearing is engaged by the lever 26 and rod 27 the movement of the rod 23, due to its connection with the rock arm 24, will lift the crank 22 and the bail 19 and rake 14 in unison. The slot will thus be seen to allow the crank 22 and rod 23 to move in unison with the reverse operation of the gear shifting mechanism when the machine is thrown out of gear but will permit the rake to remain above the cylinder 13 until the manure in the bed, which is in front of the rake 14, is discharged and then the rake will lower by gravity as its weight is forward of the pivotal center 28 on bracket 20.

A spring 60 may be used to return the rake 14, see Fig. 3, by fitting over the pivot 28 and having one end engaging the bail 19, its other end held by a pin 61 in the end of the pivot 28. To the stud 17 of the rake 14 is rigidly connected a lever 29 to which is pivoted a spring rod 30 (see Fig. 4) and this rod 30 passes through an ear 31ª of the loose link 31 which is loosely pivoted to the stud 17 of the rake 14. A spring 32 fits over the spring rod 30 and spring pressure to prevent the rake from floating and to cause it to perform its functions properly is brought about by a nut 33 on the rod 30. To the lower end of the link 31 is pivoted a radius arm 34 which is pivoted at its lower end to the side of the bed 21 at 35. By means of this radius arm 34 the rake 14 is kept in proper operative position at all times and the radius arm and link also guide the teeth 15 of the rake 14 in raising and lowering the rake 14 so that they are kept clear of the cylinder 13 and separator 1. It will be noted that the rake teeth are inclined in a rearward slant while in front of the cylinder and that they move rearwardly when being raised so that the lifting is easy and the load not packed or cramped because they are pulling away from the load and slipping out of it during the period of travel from in front to over the cylinder.

In order to set the rake teeth at any desired angle over the cylinder we provide an integral ear 29ª on lever 29 and a stop 36 is fastened to the side of the bed in any suitable adjustable way; as shown there is a radial series of apertures 37 into which the stop 36 may be set; the farther forward the stop 36 is set, the rake teeth will be proportionately set back toward the discharge opening.

It will be noted that the pivotal center 28 of the bail 19 is in rear of the center of the shaft 12; this is for the purpose of bringing the pivotal center of the separator 1 back as close as possible over the cylinder 13 and still allow clearance of the bail 19 and rake 14 with respect to the separator in raising and lowering. It is preferable to so locate the separator 1 in order to work on the extreme rear end of the load where it can best operate to separate and loosen the mass and keep the manure in motion just in advance of the rake and cylinder so that it cannot back up and clog, it being for the purpose of keeping the manure in motion dischargewardly in a loose, broken stream.

Another object in locating the separator 1 as described is to get it out of the way of loading the bed and so that the bed can be filled to its full length without any obstruction.

The means of conveying the manure along in the bed, kind of running gear or wheel and under body construction need not be particularly described as any devices suitable for these purposes may be used.

We prefer to use for the main drive, chain gearing 38 obtaining power from sprockets 39 fastened to the wheels 40 by contact with the periphery of the sprockets 39. The front ends of said chains 38 are carried by idlers 41 which are pivotally mounted on radius bars 42 having their rear ends pivoted to the bed 21, the idlers 41 and radius bars 42 being controlled and actuated by the rock arms 24 which are pivotally connected by links 43 to the radius bars 42. The rock arms 24 are pivotally mounted on a shaft 44 which is rotatably journaled in the bed 21 in any well known way not necessary to be further described. The chains 38 directly engage with sprockets 45 on the cylinder shaft 12 which in turn drive said shaft by ratchet and pawl connection of any well known type not necessary to be shown or described. As the main drive gearing is the same on both sides of the machine, but one side need be described. To the rock arm 24 is pivoted a rod 27 which extends forward and is pivotally connected to a lever 26 which is pivoted to the side of the bed at 46. On the lever 26 is mounted the usual hand latch and pull rod which latter is connected to a dog 47 sliding on the lever.

There is a sector 48 having adjustable notches 49 for the engagement of the dog 47 and these notches 49 can be set to any desired position by means of apertures 50, the surface of the sector 48 contacting with the dog 47 being smooth so that the lever can only be locked in either one or the other of the notches. By this means the notches 49 can be set so that the idlers 41 clear the teeth of the sprocket 39 safely when the machine is in gear because the dog cannot be moved past the notch at the rear of the sector. Nor can the operator neglect to raise the chains 38 to a sufficient height to insure safe clearance of the sprockets when throwing out of gear because the lever cannot be locked in the out of gear position until pushed clear forward to engagement with the forward notch which will be located at a predetermined position such as will insure proper clearance. A turn buckle 51 serves to keep the rod 23 adjusted for length to cause the raising of the rake in unison with the gear engagement and to bring the rake 14 to the proper position over the cylinder 13. In Figs. 7, 8, 9, and 10 we have shown two forms of secondary cylinders for the purpose of lateral distribution of the manure to one side of the machine. The cylinder 52 has blades 53 in sets, the sets of blades may be connected to the core 54 by lugs 55 which are riveted to both.

An axle 56 fits tightly in the core and has bearings 57 at each end which are fastened to arms 58 projecting rearwardly from the bed 21. The sets of blades 53 have wide sides set at an angle to the flow of the manure from the bed; they may be set on various angles and may project from two or more sides of the core 54, as shown they project from two sides and have serrations on their edges to tear the manure.

Approximately one-third of the width of cylinder 52 is occupied by blades 59 having forked and staggered peripheries for the purpose of cutting the manure and driving it backward but not arranged to divert the manure laterally. The blades 53 will drive the heavy portion sidewise and the blades 59 will fill out the swath in their line of discharge.

In Figs. 9 and 10 is shown a modified form of lateral distributing cylinder; in this form 62 indicates a continuous screw blade of increasing pitch from one end to the other of the cylinder, the portion indicated at 62$^a$ being only slightly inclined, the central portion at 62$^b$ having a greater pitch and the portion at 62$^c$ a still greater pitch. Preferably the distributing cylinder 52 is rotated in the same direction as cylinder 13 by means of a driving sprocket 63 which is secured to the shaft 12, a chain 64 delivers power to a driven sprocket 65 secured in any suitable way to the shaft 56. An idler 66 rotatably mounted on an idler arm 67 may be employed to take up the slack of chain 64. The idler arm 67 is pivoted at 68 to the side of the bed 21 and is arranged to exert spring tension on the chain 64 by means of a spring 69.

In Fig. 3 it will be noticed that there are pouched openings 70 at the rear of the side board extensions and just over the cylinder 13, these are for the purpose of increasing the width of throat or discharge opening so as to permit the egress of the manure as it is discharged.

It will also be noted in Figs. 1, 2, 4, 5, 7, and 8 that the blades 53 have their edges segmentally shaped, this is for the purpose of utilizing very wide blades, laterally considered, so as to obtain a wide lateral distribution of the manure and at the same time keep the edges of the blades at a uniform proximity to the teeth of the cylinder 13 so that the manure is not allowed to drop down between them.

We claim:

1. In a manure spreader, in combination, a manure bed, a discharge cylinder located at one end of said bed, a rake located over said cylinder, a manure separator pivotally supported above said cylinder in advance of said rake and laterally disposed across the width of said bed, said separator comprising a front edge presented to the rear end of the load in said bed to tear the load apart and sides to feed the manure to said discharge cylinder and means for actuating said manure separator in the line of discharge of the manure.

2. In a manure spreader, in combination, a manure bed, a discharge cylinder located at one end of said bed, a rake located over said cylinder, a manure separator pivotally supported above said cylinder in advance of said rake and extending across the width of said bed, said separator comprising a front edge facing the rear end of the load in said bed to tear the load apart and sides to feed the manure dischargewardly to said discharge cylinder above and below said point of pivotal support and means for actuating said separator in the line of discharge.

3. In a manure spreader, in combination, a manure bed, a discharge cylinder located at one end of said bed, a rake located over said cylinder, a manure separator pivotally supported above said cylinder in advance of said rake and extending laterally across the width of said bed, said separator having pivots at each end thereof, brackets at each side of said bed in which said pivots are loosely journaled, the body of said separator lying in a substantially horizontal plane when in medial position, the front edge of said separator forming means to separate the rear end of the load, the sides of said separator being means to feed the separated load dischargewardly and means for actuating said separator rapidly alternately up and down in the line of discharge of the manure from the bed.

4. In a manure spreader, in combination, a manure bed, a discharge cylinder located at one end of said bed, a rake located over said cylinder, a manure separator pivotally supported above said cylinder in advance of said rake and extending laterally across said bed, pivots at each end of said separator, brackets in which said pivots are journaled mounted at each side of said bed, said separator extending forward of the axis of said pivots and having its forward edge engaging with the rear end of the load, the sides of said separator being means to feed the separated manure dischargewardly and means to vibrate said separator rapidly in the line of discharge.

5. In a manure spreader, in combination, a manure bed, a discharge cylinder located at one end of said bed, a rake located over said cylinder, a manure separator pivotally supported above said cylinder in advance of said rake and laterally disposed across the width of said bed, said separator comprising a front edge to separate the rear end of the load in said bed and having sides to feed the separated manure dischargewardly to said cylinder, a drive arm mounted on the shaft of said cylinder, a crank connected to said separator and a pitman pivotally connected to said crank and said drive arm whereby said separator is vibrated in the line of discharge and whereby the sides of said separator alternately feed the manure in a loose stream to said cylinder.

6. In a manure spreader, in combination, a manure bed, a discharge cylinder located at one end of said bed, a rake located over said cylinder, a manure separator pivotally supported above said cylinder in advance of said rake and laterally disposed across the width of said bed, said separator comprising a front edge to separate the rear end of the load in said bed and having sides to feed the separated manure dischargewardly to said cylinder, means to actuate said separator to separate and feed the manure and side board extensions of said bed projecting forward of said separator and above said separator to keep the separated manure from spilling from said bed.

7. In a manure spreader, in combination, a manure bed, a discharge cylinder located at one end of said bed, a rake located over said cylinder, a manure separator pivotally supported above said cylinder in advance of said rake and laterally disposed across the width of said bed, said separator comprising a front edge to separate the rear end of the load and having sides to feed the manure dischargewardly to said cylinder, means to actuate said separator to separate and feed the manure and pouched openings above said separator to prevent the spilling of the manure over the sides of the bed above said cylinder and to allow easy discharge of the manure.

8. In a manure spreader, in combination, a manure bed, a discharge cylinder located at one end of said bed, a rake located over said cylinder, a manure separator pivotally supported above said cylinder in advance of said rake and laterally disposed across the width of said bed, said separator comprising a serrated front edge to tear and separate the rear end of the load and having sides to feed the manure to said cylinder and means to actuate said separator by which the sides thereof are alternately brought in feeding contact with the manure and by which it is fed in a loose stream to said cylinder.

9. In a manure spreader, in combination, a manure bed, a discharge cylinder located at one end of said bed, a rake located over said cylinder, a manure separator pivotally supported above said cylinder in advance of said rake and laterally disposed across the width of said bed, said separator comprising a front edge to separate the manure and having sides to feed the manure to said cylinder, means to actuate said separator in a vibratory path of travel whereby the load is spread evenly over the width of said cylinder as discharged from said bed and a secondary rotating cylinder in rear of said discharge cylinder and means connected with said secondary cylinder whereby the manure is distributed laterally in a wide swath on the ground.

10. In a manure spreader, in combination, a manure bed, a discharge cylinder located at one end of said bed, a secondary cylinder located in rear of said discharge cylinder, driving connection from the shaft of said discharge cylinder to the shaft of said secondary cylinder whereby said secondary cylinder is rotated at high speed and means connected with said secondary cylinder for pulverizing and laterally distributing the manure in one direction comprising a series of wide screw blades having their broad sides increasing in pitch at an oblique angle to the line of discharge of manure from one side of said bed to the opposite side and their peripheral edges formed in a circle whereby the proximity of the peripheries of said two cylinders is maintained uniform during the revolution of said two cylinders.

11. In a manure spreader, in combination, a manure bed, a discharge cylinder located at one end of said bed, a secondary cylinder located in rear of said discharge cylinder, rotative driving connection from the shaft of said discharge cylinder to the shaft of said secondary cylinder, means connected with said secondary cylinder for pulverizing and laterally distributing the manure in one direction comprising two series of blades, one series having edges to drive the manure backward in the line of discharge from said bed, the other series having their sides set at an oblique angle to the line of discharge from said bed to distribute the manure laterally in one direction in a wide swath.

12. In a manure spreader, in combination, a manure bed, a discharge cylinder located at one end of said bed, gear shifting mechanism, a rake pivotally supported above said cylinder, supporting mechanism for said rake which swings downward and forward and supports said rake in front of said cylinder, operative connection between said gear shifting mechanism and said supporting mechanism, an adjustable stop device adjustably connected with said spreader and a contacting device connected with said rake which comes in contact with said stop to set said rake at any desired angle above said cylinder.

13. In a manure spreader, in combination, a manure bed, a discharge cylinder located at one end of said bed, gear shifting mechanism, a rake pivotally supported above said cylinder, supporting mechanism for said rake which swings downward and forward and supports said rake in front of said cylinder, operative connection between said gear shifting mechanism and said supporting mechanism, one member of said operative connection being a device which positively lifts said rake over said cylinder in time with the engagement of said gear shifting mechanism but which permits said rake to return to a position in front of said cylinder independently of the movement of said gear shifting out of gear, an adjustable stop device adjustably connected with said spreader and a contacting device connected with said rake which comes in contact with said stop to set said rake at any desired angle above said cylinder.

14. In a manure spreader, a bed, a discharge cylinder carried therein, and vibrating means disposed across the discharge end of said bed in front of the cylinder, said means having an edge presented against the load of material in said bed for separating the same and a movable body portion to direct the material to the cylinder.

15. In a manure spreader, a bed, means disposed across the discharge end of said bed for separating the material therein, said means comprising vanes carried on a horizontal axis, and means for rocking said vanes about their axis.

16. In a manure spreader, a bed, means disposed across the discharge end of said bed for separating the material therein, said means comprising a horizontal axial support, vanes carried thereon, a crank arm on the end of said support, and a pitman for oscillating said arm.

17. In a manure spreader, a bed, a main discharge cylinder therein, and a supplementary cylinder comprising a series of screw blades increasing in pitch from one end of the cylinder to the other.

18. In a manure spreader, a bed, a discharge cylinder therein, a rake movable from a position in front of the cylinder to one above, driving mechanism for the cylinder, means for controlling the driving mechanism, said means being also arranged to positively raise the rake when throwing the cylinder driving mechanism into operation, and a slotted connection between the rake and controlling means whereby the rake may remain in raised position when the driving mechanism is thrown out of operation.

19. In a manure spreader, a bed, a discharge cylinder therein, a combined end-gate and detainer movable from a position in front of the cylinder to one above, and swinging connections for said end-gate and detainer pivotally mounted on the bed above and substantially in line with the central portion of said cylinder.

In testimony whereof I affix my signature in presence of two witnesses.

WILLIAM N. WHITELY, Jr.,
*Administrator of the estate of William N. Whitely, deceased.*

WILLIAM N. WHITELY, Jr.

Witnesses:
G. W. BRUNTON,
CHARLES McNIERY.